US008621417B2

(12) United States Patent
Kaulgud et al.

(10) Patent No.: US 8,621,417 B2
(45) Date of Patent: Dec. 31, 2013

(54) RULE MERGING IN SYSTEM FOR MONITORING ADHERENCE BY DEVELOPERS TO A SOFTWARE CODE DEVELOPMENT PROCESS

(75) Inventors: Vikrant Shyamkant Kaulgud, Maharashtra (IN); Vibhu Saujanya Sharma, Aligarh (IN)

(73) Assignee: Accenture Global Services Limited, Dublin (IE)

( * ) Notice: Subject to any disclaimer, the term of this patent is extended or adjusted under 35 U.S.C. 154(b) by 266 days.

(21) Appl. No.: 13/159,153

(22) Filed: Jun. 13, 2011

(65) Prior Publication Data
US 2012/0317541 A1  Dec. 13, 2012

(51) Int. Cl.
*G06F 9/44* (2006.01)

(52) U.S. Cl.
USPC ........... 717/102; 702/186; 717/104; 717/105; 717/120; 717/124

(58) Field of Classification Search
None
See application file for complete search history.

(56) References Cited

U.S. PATENT DOCUMENTS

| | | | | |
|---|---|---|---|---|
| 7,434,202 | B2* | 10/2008 | Kramer | 717/120 |
| 7,603,653 | B2* | 10/2009 | Sundararajan et al. | 717/105 |
| 8,146,059 | B2* | 3/2012 | Ponsford et al. | 717/124 |
| 8,341,591 | B1* | 12/2012 | Knauth et al. | 717/102 |
| 2003/0046029 | A1* | 3/2003 | Wiener et al. | 702/186 |
| 2008/0222631 | A1 | 9/2008 | Bhatia et al. | |
| 2009/0070734 | A1* | 3/2009 | Dixon et al. | 717/102 |
| 2011/0023010 | A1* | 1/2011 | Kim | 717/104 |
| 2013/0080992 | A1* | 3/2013 | Chaar et al. | 717/102 |

FOREIGN PATENT DOCUMENTS

CN  101599013 A  12/2009

OTHER PUBLICATIONS

Gerard Wolff, "Towards a new concept of Software", 1994, Software Engineering Journal, pp. 27-38, <http://ieeexplore.ieee.org/stamp/stamp.jsp?tp=&arnumber=265660>.*
Michael Kleyman, "Refactoring Aspects into Java Code", 2007, Tel Aviv University, pp. 35-47, <http://ieeexplore.ieee.org/stamp/stamp.jsp?tp=&arnumber=4384083>.*
Markus Volter, "Model-Driven Software Development", 2006, ingenieur bürofür software technologie, pp. 1-39, <http://www.st.informatik.tu-darmstadt.de/pages/lectures/se/ws06-07/design/lecture/1_modelDrivenSoftwareDevelopment-1x1.pdf>.*

(Continued)

*Primary Examiner* — Thuy Dao
*Assistant Examiner* — Khanh Dang
(74) *Attorney, Agent, or Firm* — Harrity & Harrity, LLP

(57) ABSTRACT

In a rule-based system for monitoring process adherence, first and second processing patterns are received and merged to provide a merged processing pattern. Each processing pattern, which may be expressed in a state graph representation, embodies at least a portion of a desired software code development process. Optionally, the merged processing pattern may be presented to a subject-matter expert to obtain feedback thereon. The merged processing pattern may then be converted into an executable process verification rule for use in monitoring process adherence. In an embodiment, development process event data is compared to the executable process verification rules. Violations of the rules result in the generation of failure indications that may be stored and subsequently reported as needed. In this manner, efficiency of automated process adherence monitoring systems may be improved when determining the level of compliance by developers with one or more software code development processes.

20 Claims, 11 Drawing Sheets

(56) References Cited

OTHER PUBLICATIONS

Jonathan Cook, "Discovering Models of Software Processes from Event-Based Data", 1998, New Mexico State Univ., Las Cruces, pp. 215-249, <http://delivery.acm.org/10.1145/290000/287001/p215-cook.pdf>.*

Anonymous, "JUNG (Java Universal Network/Graph) Framework Manual", Internet citation, 2077-08-11, pp. 1-15, XP002504092, retrieved from the Internet: http://web.archive.org/web/20070811064752/http://jung.sourceforge.net/doc/manual.html retried on Nov. 17, 2008 (whole document).

Search Report issued in EP Application No. 11166785 on Oct. 14, 2011.

H. Kou, "Studying Micro-Processes in Software Development Stream", Jul. 1, 2005, http://www.ics.hawaii.edu/research/tech-reports/ICS2005-07-01.pdf/view.

P. Johnsen & H. Kou, "Automated Recognition of Test-Driven Development with Zorro", Agile Conference, Aug. 2007.

"Domain-Specific Language", http:P//en.wikipedia.org/wiki/Domain-specific_language, as accessed Aug. 27, 2009.

V. Sharma and V. Kaulgud, "Micro-Process Adherence for Delivering Reliable Software", ISSRE Conference, Nov. 16, 2009.

F. Schlesinger and S. Jekutsch, "ElectroCodeoGram: An Environment for Studying Programming", TeamEthno-online, Issue 2, Jun. 2006, pp. 67-76.

"JUNG—Java Universal Network/Graph Framework", jung.sourceforge.net, Aug. 15, 2003, 3 pages.

"GQL4jung—A graph query language for jung—Google Project Hosting", http://code.google.com/p/gql4jung, Jun. 11, 2009, 1 page.

* cited by examiner

| CONFIGURE SENSORS | SENSOR CONFIGURATION — 1102 | | | |
|---|---|---|---|---|
| | ENABLE SENSOR? | SENSOR DESCRIPTION | XMISSION INTERVAL (MINS) | SENSOR WEBSERVICE LOC. |
| 1104 | ☒ | IDE Developer edit actions | 5 | |
| RULE MANAGER | ☐ | Unit test harness - JUnit | 5 | |
| 1106 | ☐ | FxCop code quality tool | 5 | |
| REPORTS | ☒ | ACQT code quality tool | 30 | |
| 1108 | ☒ | Subversion client | 1 | |
| | ☐ | SVN repository | 5 | http://10.186.1.32/api/svnr |
| 1110 | ☒ | Work item tracker | 180 | http://10.186.1.150/api/wit |
| QUICK VIEW SENSORS CONFIGURED: 0 RULES CONFIGURED: 0 | ☐ | Project management tool | 180 | http://10.186.1.1/api/pmt |
| | | | 1112 | SAVE SENSOR CONFIGURATION |

FIG. 11

RULE MERGING IN SYSTEM FOR MONITORING ADHERENCE BY DEVELOPERS TO A SOFTWARE CODE DEVELOPMENT PROCESS

FIELD OF THE INVENTION

The instant disclosure relates generally to the development of software code and, in particular, to techniques for merging rules in systems for monitoring adherence by developers to a software code development process.

BACKGROUND OF THE INVENTION

Software code—comprising instructions that may be used to control or instruct the operation of one or more processing devices such as microprocessors, microcontrollers, co-processors, etc.—is ubiquitous and pervades many aspects of modern day technology. The scope of software development projects, sometimes involving numerous software developers (i.e., those persons responsible for the actual drafting of software code) working over periods of many months or even years, requires the use of software code development processes that developers need to adopt in order to provide high quality code. Such software development processes generally specify the various steps developers must take prior to considering the software code "completed." For example, software development processes may specify how developers are to review code quality, perform unit testing, fix defects etc. before the code is checked in using well-known configuration management and/or source control repository tools.

Practice has demonstrated that ensuring high fidelity adoption of software code development processes results in higher quality code. Improved quality of such software code ultimately leads to improved quality of the overall, integrated software project and, ultimately, improved end-user satisfaction. Conversely, failure by developers to adhere to such software code development processes results in an increased likelihood of lower quality code, more errors in code functionality, increased integration problems and end-user dissatisfaction.

Despite the importance of following code development processes, it remains difficult today (particularly on large projects employing numerous and/or geographically diverse developers) for project managers to verify that developers are actually adhering to the recommended software code development processes. Since the actual creation of the software code typically occurs on the local workstations and integrated development environments (IDE) of a number of developers, it is almost always physically impossible for a project manager to directly monitor each developer's workstation and his/her work. This lack of oversight often leads to developers bypassing the software code development processes thereby reducing the quality of the resulting code. Furthermore, the time and effort required to correct the resulting quality issues decreases the overall efficiency with which the development project is completed.

To address these issues, systems have been developed to provide automated monitoring of the adherence of developers to software development processes. For example, Johnson and Kou described the so-called Zorro system in "Automated Recognition of Test-Driven Development with Zorro", AGILE 2007. The Zorro system uses an open source framework (Hackystat) for deploying "sensors" in various development environment tools to collect time-stamped, raw event data. A Software Development Stream Analysis (SDSA) application analyzes the raw event data to determine the presence of "episodes" within the time-ordered stream of event data. The Zorro application then performs rule-based analysis of the episodes to determine whether developers are adhering to a specific development process, e.g., test driven development (TDD). While systems such as Zorro are beneficial to determining the adherence of developers to desired processes, it is foreseeable that more complex processes will require tracking of a significant number of states (e.g., the episodes used in the Zorro system), thereby leading to a larger number of more complex rules. In order to better scale process adherence monitoring systems like Zorro, it would be beneficial to provide techniques for more efficiently managing the rules used to assess process adherence.

SUMMARY OF THE INVENTION

The instant disclosure enables project managers or the like to monitor adherence of software developers to one or more software code development processes. Generally, this is achieved through capture of the occurrence of relevant activities performed by developers, as indicated by the development tools they use, and the subsequent comparison of these activities with rule-based models of the desired software code development process(es). Differences between a given rule-based model and the captured activities are indicative of a failure to adhere to a software development process. In an embodiment, management of rules is fostered when first and second processing patterns are received and merged to provide a merged processing pattern. Each processing pattern, which may be received by a processing device via a textual and/or graphical user interface, represents at least a portion of a desired software code development process. Optionally, the merged processing pattern may be presented to a subject-matter expert to obtain feedback thereon. The merged processing pattern may then be converted into an executable process verification rule for use in monitoring process adherence.

In an embodiment, merging of processing patterns is accomplished by first converting the respective processing patterns into graph form. The resulting first and second graphs are compared to determine points of intersection between the first and second graphs such that a merged graph may be produced. The merged graph is then converted into the merged processing pattern and subsequently processed as noted above.

In one embodiment described herein, an event collection component collects development process event information generated by developers and a rule execution component compares it with one or more executable verification rules representative of a software code development process. If any conditions of the at least one executable verification rules are not met through these comparisons, one or more failure indication are generated and stored. Thereafter, a reporting component can generate a report concerning the failure indication for subsequent presentation to a user.

In yet another embodiment, the event collection component employs a data collection component that collects raw development process event data from one or more development tools used by the developers. Thereafter, filtering rules are employed to filter the raw development process event data to provide the development process event information. A query formation component may be employed to formulate the filtering rules.

Various methods and apparatus in accordance with these embodiments and others are further described herein. In this manner, the instant disclosure provides techniques that improve the efficiency by which automated process adherence monitoring systems are able to determine the level of compliance by developers with one or more software code development processes. For example, the rule merging capabilities described herein reduce the number of rules that must be maintained and the processing required to assess such rules. That is, the burden of keeping track of and periodically assessing multiple different rules is reduced without any loss in coverage provided by the merged rules in comparison with the un-merged rules. Furthermore, the speed with which the rules are evaluated may be improved. Absent merging, states that are actually common to two or more rules would need to be independently assessed for each rule. This incurs an increased processing burden in order to assess all of the rules. Merger of such common states eliminates their redundant assessment, lowering processing overhead and beneficially reducing the time it takes to assess the rules. Such improved monitoring capability therefore ensures better process adherence and subsequent improvement in software code quality, overall development efficiency and end-user satisfaction.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIGS. 11-13 are diagrams illustrating various embodiments of a graphical user interface in accordance with various embodiments described herein.

DETAILED DESCRIPTION OF THE PRESENT EMBODIMENTS

Figure 1:
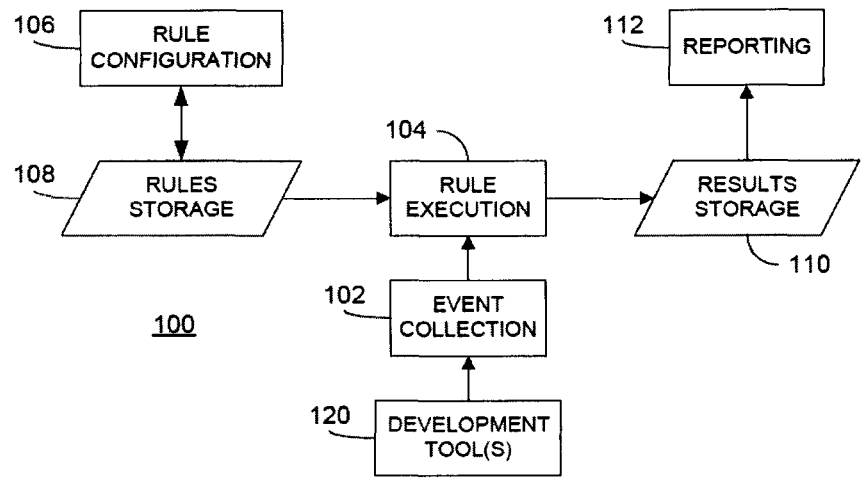
FIG. 1 is a block diagram of an apparatus in accordance with the instant disclosure.

Referring now to FIG. 1, an apparatus 100 for use in monitoring adherence by software code developers to one or more software code development processes is shown. In particular, the apparatus 100 comprises an event collection component 102 operatively connected to a rule execution component 104. A rule configuration component 106 is operatively connected to a rules storage component 108 that, in turn, is operatively connected to the rule execution component 104. A results storage component 110 is operatively connected to both the rule execution component 104 and a reporting component 112, as shown. As further shown, one or more development tools 120 communicate with the system 100 via the event collection component 102.

Generally, the event collection component 102 collects development process event information from the one or more development tools 120. The development process event information comprises data concerning actions taken by developers as manifested by the one or more development tools 120. Such data may include an indication of the particular nature of the action taken by (or event caused by) the developer, the date and/or time when the event or action occurred, as well as an identification of the particular developer that caused the event or action to occur. The development tools 120 comprise any apparatus used by developers in the drafting or production of software code that is also susceptible to automated collection of the data constituting the development process event information. For example, the development tools 120 may comprise any of a number of well-known IDE tools, such as the "ECLIPSE" IDE, Microsoft "VISUAL STUDIO", BEA "WORKSHOP", Oracle "JDEVELOPER", etc. As known in the art, the development tools 120 typically comprise an application protocol interface (API) that permits the collection of the event information. Although not depicted in detail in FIG. 1, the connection between the event collection component 102 and the development tool(s) 120 may be in accordance with well-known techniques and may comprise, for example, a network connection as implemented by one or more of a local area network, a private or public (e.g., the World Wide Web/Internet) wide area network, etc.

Based on the development process event information thus collected, the rule execution component 104 compares conditions established by one or more executable verification rules (stored in the rules storage component 108) against the development process event information. Each executable verification rule, stored in the rule storage component 108, is representative of a software code development process to the extent that the conditions established by the executable verification rule establish those actions or events needed to be identified within the development process event information in order to confirm that a developer has (or has not) properly adhered to the software code development process. For example, a software code development process may require that a given code quality tool is to be used on a given portion of code (e.g., a module, sub-routine, etc.) subsequent to the most recent edits to that portion of code but before such code is checked into the configuration management repository. In executable form, this software code development process may require a sequence of actions/events in which the latest indication of that portion of code being modified within a developer's IDE has a time/date stamp that is earlier than an indication of the quality tool being run on that portion of code, which in turn must have a date/time stamp that is earlier than an indication that the portion of code has been checked into the configuration management repository. Failure to satisfy any of these conditions, either through failure to perform one of the operations (e.g., run the code quality tool on that portion of code) or to perform them out of sequence (e.g., further edits to the portion of code indicated after the most recent execution of the code quality tool on the portion of code) will cause a failure indication to be generated. In an embodiment, execution of the rules against the development process event information is performed on some regular interval, e.g., weekly, bi-weekly, monthly, etc. The frequency of execution of the rules is based in part upon the need to scale such execution given the number of developers in question. Furthermore, for relatively complex rules, it is quite possible that the related events/states could be relatively spaced apart in time. In these instances, less frequent rule execution may be desirable in order to ensure adequate time. Further still, it may be desirable to execute different types of rules at different frequencies, e.g., less complex rules more frequently and more complex rules less frequently.

A failure indication comprises data indicating that a particular executable verification rule (being representative of a corresponding software code development process) has not been satisfied. In an embodiment, the failure indication includes an identification of the particular software code development process/executable verification rule that has been violated as well as an indication of the developer(s) that gave rise to the violation. To further provide developers and managers information regarding how a process was violated, the failure indication may comprise additional information regarding the exact part of the rule that was not satisfied, thereby enabling the determination of remediation steps such as training, process re-design etc. As noted, such failure indications are stored in the results storage 110. For example, the results storage 110 can be organized as a database, thereby allowing the reporting component 112 to be implemented using a database query interface. In this manner, queries can be formed (using well known techniques) to determine which failure indications in the results storage 110 satisfy the specified query. The returned results can then be provided to a user in any suitable format and via a suitable interface using well known techniques.

Figure 6:
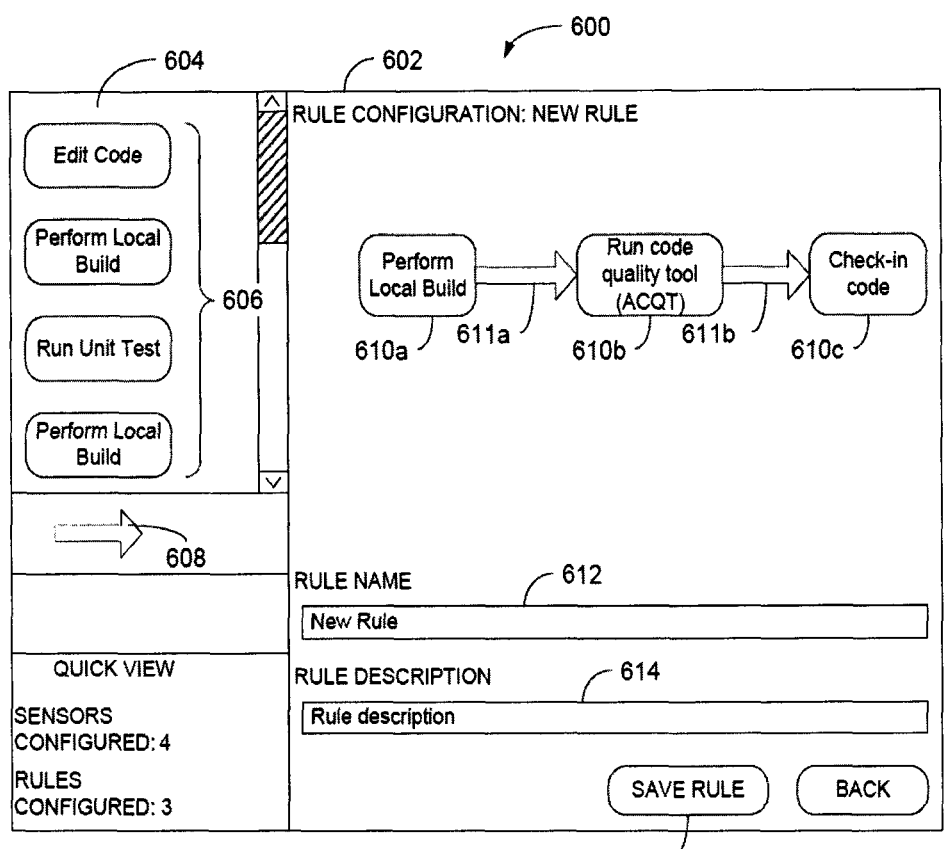
FIG. 6 is a diagram illustrating an embodiment of a graphical use interface used to capture processing patterns in accordance with an embodiment described herein.

In an embodiment, the rule configuration component 106 supports one or more user interface methods for receiving data from a user concerning the software code development processes and converting that data into the executable verification rules. In particular, a user interface is used to supply one or more process patterns to the rule configuration component 106. A process pattern comprises data provided by a user that is descriptive of a given development process and that may be converted, transformed or otherwise processed to provide an executable verification rule. For example, as described in greater detail below, a graphical user interface (an example of which is illustrated in FIG. 6) may be used to specify process patterns. Alternatively, a textual user interface whereby a user enters text strings descriptive of the process may also be employed, e.g., "Developers should run the X quality check tool after editing a module and before checking the module in using the Y configuration management tool." Regardless of the interface type employed, the rule configuration component 106 allows users to flexibly define and/or edit process patterns that, in turn, may be used to provide the executable verification rules.

Figure 2:
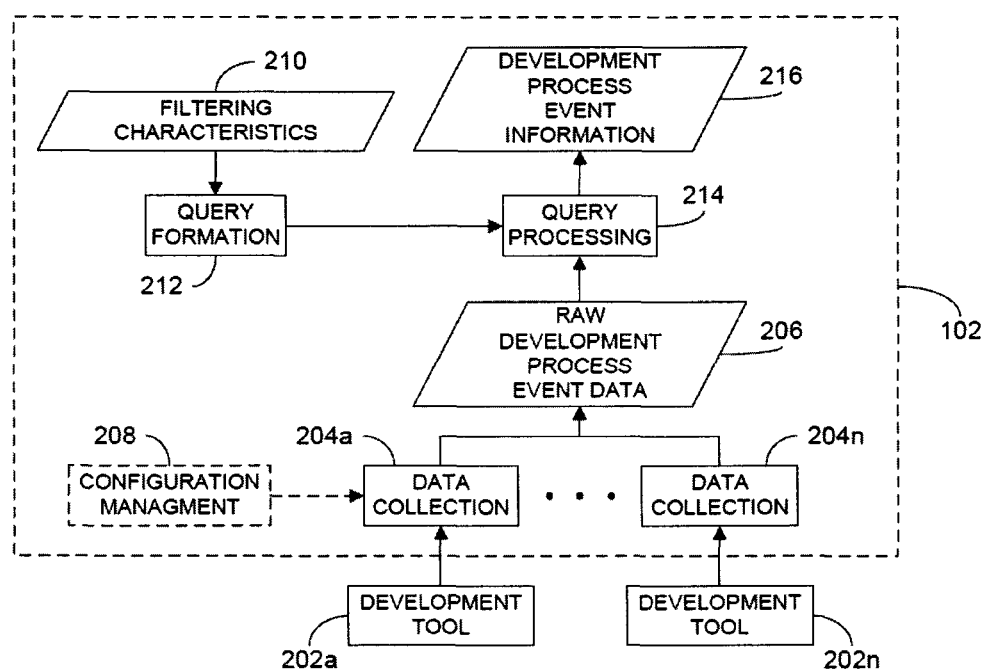
FIG. 2 is a block diagram of an event collection component of the apparatus of FIG. 1 illustrated in further detail.

Referring now to FIG. 2, the event collection component 102 is illustrated in greater detail. In the illustrated embodiment, the event collection component 102 comprises a plurality of data collection components 204a-n operatively connected to a plurality of development tools 202a-n. A variety of techniques for implementing such data collection components 204 will be known to those having ordinary skill in the art. For example, in the illustrated embodiment, each data collection component 204 may access an API of its respective development tool 202 via one or more intervening communication networks. Alternatively, each data collection component 204 may be co-resident on a given workstation with its corresponding development tool 202 and thereby communicate with the development tool 202 via internal channels of the workstation. Further still, a given data collection component 204 may be incorporated directly into its corresponding development tool 202 as in the case, for example, of a so-called "plug in" program or the like. Each data collection component 204 may operate in a "push" or "pull" configuration, as known in the art. In a push configuration, a data collection component 204 actively provides the raw event data as it is detected. Conversely, in a pull configuration, a data collection component 204 periodically requests or otherwise obtains the raw event data from the development tool 202, e.g., by reading a log maintained by the development tool. Optionally, a configuration management component 208 may be provided to allow a user to deploy specific sensors, select which sensors should be active, etc. An embodiment of such a configuration management component 208 is described below with reference to FIG. 12.

Each data collection component 204 operates, effectively, as a sensor to collect raw development process event data 206. The raw development process event data 206 constitutes a "noisy" data stream to the extent that, in addition to event data of particular use by the system 100, there is also a substantial portion of the raw development process event data 206 that is not useful for this purpose. Such extraneous data, if not filtered out, would negatively effect the efficiency of, and potentially the accuracy of, the system 100 in monitoring process adherence. For example, where the development tool comprises an instance of an IDE on an individual developer's workstation, the raw development process event data 206 collected by the corresponding data collection component may include, in addition to events of interests (e.g., "module created", "module opened", "module edited", "module closed", "unit test invoked", number of lines added or modified in a edit session etc.), other event data such as "user login", specific operations performed on a software code file (e.g., addition or modification of variables), etc. that does not aid in monitoring process adherence. It is noted that, since the raw development process event data 206 could be reused for many purposes, the data collection components 204 collect a comprehensive set of data such as timestamp, developer name, machine name, event category, event sub category, tool name, event log etc.

The raw development process event data 206 may be stored in a suitable storage component such as computer memory or the like as embodied, for example, by a database implemented by a suitable database management system. Thereafter, a query processing component 214 may be used to extract only the useful portions of the raw development process event data 206 based on appropriately configured queries provided by a query formation component 212. In turn, the queries provided by the query formation component 212 may be formed according to filtering characteristics 210 provided by a user of the system 100. For example, consider a project that wants to focus only on the events related to code quality tool and further focus only on a specific tool; say PMD (a well known code quality tool for use with "JAVA" language programs). In this case, the query will use the event category and the tool name parameters to filter the raw event data and extract only those events generated by PMD. In an embodiment, the filtering characteristics 210 are defined by project users as a set of configuration property options to the system. For example, the filtering characteristics 210 can be entered using configuration files or a user interface mechanism that provides the user with a set of available characteristics whereby the user selects/de-selects characteristics depending on requirements. Using these filtering characteristics, the query formation component 212 essentially creates a filter. As an example of implementation, the filter can be implemented as a SQL query that works on the raw event data 206. For example, a query such as "SELECT * FROM EVENTS WHERE TOOL LIKE 'PMD'" will select all characteristics of events generated by a PMD tool. Further filtering can be achieved by including specific fields as part of the SELECT clause, e.g. using developer name and timestamp as a constraint will result in processed event information consisting of developers who have executed PMD tool and the time of execution.

The output of the query processing component 214 is development process event information 216. Having been filtered as described above, the development process event information 216 should comprise data corresponding to those events most useful in determining software development process adherence. As with the raw development process event data 206, the development process event information 216 may be stored in a suitable storage component such as computer memory or the like as embodied, for example, by a database implemented by a suitable database management system.

Figure 3:
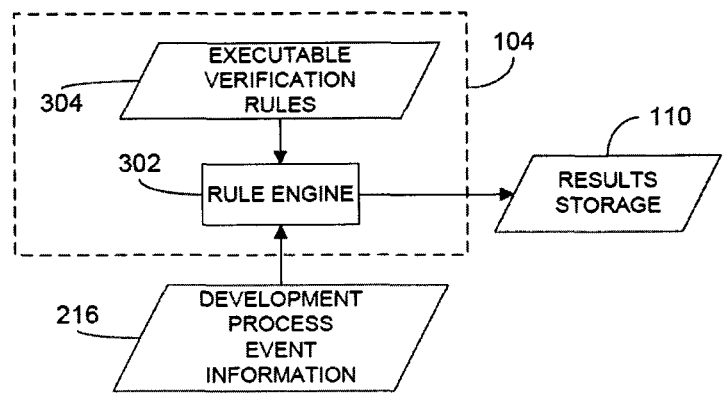
FIG. 3 is a block diagram of a rule execution component of the apparatus of FIG. 1 illustrated in further detail.

FIG. 3 illustrates an embodiment of the rule execution component 104 in greater detail. In particular, the rule execution component 104 comprises a rule engine 302 that operates based on one or more executable verification rules 304 (as obtained, for example, from the rules storage component 108) and the development process event information. In an embodiment, the rule execution component 104 is implemented as stored instructions executed by one or more processing devices, as known in the art. Thus, an instance of the rule engine 302 is first generated and the executable verification rules 304 are loaded into working memory used by the rule engine. Furthermore, the development process event information 216 (or, at least a portion thereof) is also loaded into the working memory of the rule engine 302.

As known in the art, the process of populating the working memory of the rule engine 302 is referred to as fact assertion. After populating the working memory with the necessary rules and event information, a rule inference mechanism of the rule engine attempts to find matches between the asserted facts (the event information) and the rules. As further known in the art, the rule inference mechanism may employ forward chaining, in which the rule inference mechanism compares the antecedents or conditions of each rule against the asserted facts and, if a match is found, adds the consequent of each rule to the asserted facts, i.e., the rule is satisfied if its conditions are met. Alternatively, the rule inference mechanism may employ backward chaining in which it first attempts to match the consequent of each rule and, when such a match is found, further attempts to find a match to the antecedent of the matched rule, i.e., if the goal of the rule is found, the rule is satisfied if its conditional statement is also found. Alternatively, a given rule may not be implicated by a given set of asserted facts to the extent that neither its antecedents nor goal may be recognized in the asserted facts. Still other implementations of the rule engine 302 may be evident to those of ordinary skill in the art. Regardless of the mechanism employed, after all of rules have been checked, their respective statuses (i.e., satisfied, violated and/or not implicated) can be placed in the results storage component 110 as shown. Furthermore, additional information concerning any rule violations may also be stored in the results storage component 110. For example, such additional information may comprise identification(s) of the developer(s) giving rise to the events implicated by a given rule violation, time stamps concerning when such events occurred, identification of the violated rule, etc.

Figure 4:
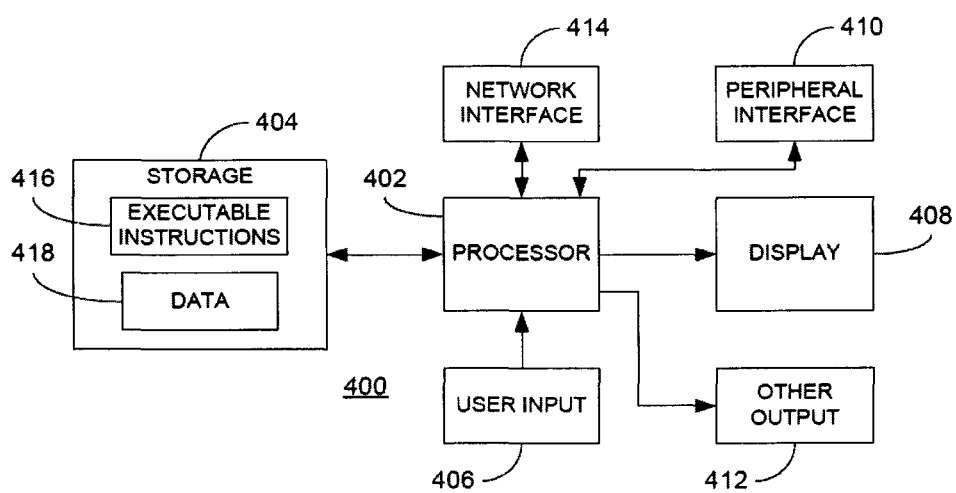
FIG. 4 is a block diagram of a processing device that may be used to implement various embodiments described herein.

Referring now to FIG. 4, a representative processing device 400 that may be used to implement the teachings of the instant disclosure is further illustrated. The device 400 may be used to implement, for example, one or more components illustrated in FIGS. 1-3. Regardless, the device 400 comprises a processor 402 coupled to a storage component 404. The storage component 404, in turn, comprises stored executable instructions 416 and data 418. In an embodiment, the processor 402 may comprise one or more processing devices such as a microprocessor, microcontroller, digital signal processor, or combinations thereof capable of executing the stored instructions 416 and operating upon the stored data 418. Likewise, the storage component 404 may comprise one or more devices such as volatile or nonvolatile memory including but not limited to random access memory (RAM) or read only memory (ROM). Further still, the storage component 404 may be embodied in a variety of forms, such as a hard drive, optical disc drive, floppy disc drive, etc. Processor and storage arrangements of the types illustrated in FIG. 4 are well known to those having ordinary skill in the art. In one embodiment, the processing techniques described herein are implemented as a combination of executable instructions and data within the storage component 404.

As shown, the device 400 may comprise one or more user input devices 406, a display 408, a peripheral interface 410, other output devices 412 and a network interface 414 in communication with the processor 402. The user input device 406 may comprise any mechanism for providing user input to the processor 402. For example, the user input device 406 may comprise a keyboard, a mouse, a touch screen, microphone and suitable voice recognition application or any other means whereby a user of the device 400 may provide input data to the processor 402. The display 408, may comprise any conventional display mechanism such as a cathode ray tube (CRT), flat panel display, or any other display mechanism known to those having ordinary skill in the art. In an embodiment, the display 408, in conjunction with suitable stored instructions 416, may be used to implement a graphical user interface. Implementation of a graphical user interface in this manner is well known to those having ordinary skill in the art. The peripheral interface 410 may include the hardware, firmware and/or software necessary for communication with various peripheral devices, such as media drives (e.g., magnetic disk or optical disk drives), other processing devices or any other input source used in connection with the instant techniques. Likewise, the other output device(s) 412 may optionally comprise similar media drive mechanisms, other processing devices or other output destinations capable of providing information to a user of the device 400, such as speakers, LEDs, tactile outputs, etc. Finally, the network interface 414 may comprise hardware, firmware and/or software that allows the processor 402 to communicate with other devices via wired or wireless networks, whether local or wide area, private or public, as known in the art. For example, such networks may include the World Wide Web or Internet, or private enterprise networks, as known in the art.

While the device 400 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 400 may include a greater or lesser number of components than those illustrated. Once again, those of ordinary skill in the art will appreciate the wide number of variations that may be used is this manner. Further still, although a single processing device 400 is illustrated in FIG. 4, it is understood that a combination of such processing devices may be configured to operate in conjunction (for example, using known networking techniques) to implement the teachings of the instant disclosure.

Figure 5:
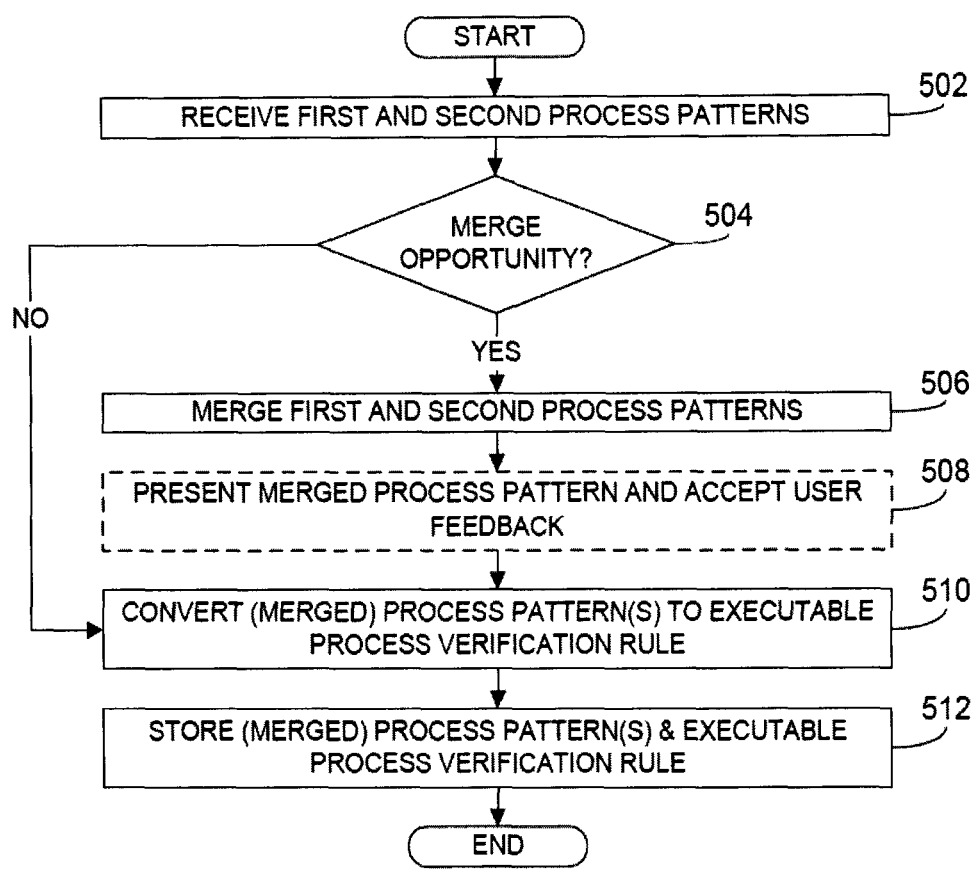
FIG. 5 is a flowchart illustrating handling of processing patterns in accordance with the instant disclosure.

FIG. 5 is a flowchart illustrating handling of processing patterns in accordance with the instant disclosure. In an embodiment, the operations illustrated in FIG. 5 are carried out by the processing device 400 illustrated in FIG. 4 when implementing the system 100 of FIG. 1. Thus, beginning at block 502, processing begins where a first processing pattern and a second processing pattern are received, for example, by the rule configuration component 106. As noted above, this may be achieved through the use of a suitable textual and/or graphical user interface. A representative embodiment of a graphical user interface for this purpose is further illustrated in FIG. 6.

In the illustrated example, the graphical user interface 600 comprises a configuration window 602 and a palette window 604. Collectively, the configuration window 602 and the palette window 604 implement the front end of a domain-specific language (DSL) used to capture process patterns. In an embodiment, the graphical user interface 600 may be implemented using any of a number of well known tools that assist in the development of a DSL, such as the Generic Eclipse Modeling System (GEMS) used in conjunction with the Eclipse integrated software development environment (IDE). As known in the art, a domain-specific language is a programming or specification language dedicated to a particular domain, representation technique and/or solution technique, as opposed, for example, to a general purpose programming language. This is illustrated in FIG. 6 where a plurality of template components 606, specific to software development processes, are provided within the palette window 606. As shown, each of the template components 604 embodies a known state (or action, event, etc.) typically found in the domain of software development processes. For example, it is known in the field of software development that a typical event that should occur is for a developer to edit a certain portion of code. The occurrence of this is therefore represented as a generic state indicated by the template component labeled "Edit Code". The underlying raw events that need to occur in order to demonstrate that a developer has, in fact, edited code are defined as conditions (as indicated, for example, by a subject matter expert) set forth in the "Edit Code" template. Using this known technique, further examples of typical and/or desirable states may be defined in order to ensure that all desired software development processes may be adequately captured.

In the example illustrated in FIG. 6, each template component is represented by a combination of a graphical icon and text string although those having skill in the art will appreciate that this is not a requirement. In an embodiment, selection information may be received via a user input device operating in conjunction with the graphical user interface, e.g., a mouse and cursor combination, whereby a user positions a cursor over a given icon and clicks a button on the mouse to select the icon. Referring again to the embodiment illustrated in FIG. 6, the selection information may further include information indicating that the user has dragged and dropped (again using, for example, a cursor/mouse combination) the selected icon into the configuration window 602. These processes may be repeated until all of the desired states 610 are placed in the window 602. Furthermore, a connector template 608 is provided to indicate flow between the various states. As known in the art, when defining state diagrams, the connector 611 may be configured to define the conditions that cause the state machine to move from one state to another. Collectively, the desired states 610 and connectors 611 between such states define an example of a process pattern. As further shown, a rule name field 612 may provided such that a user may provide a name for the rule, whereas a rule description field 614 is provided in order to capture a more detailed textual description of the rule defined by the process pattern. Once the process pattern and accompanying data 612, 614 has been fully provided, a user may select a save button 616 in order to save the entered data for subsequent use.

As noted above, rather than using a graphical user interface 600 to capture process patterns, a textual user interface may be equally employed for this purpose. As known in the art, such an interface may include the necessary prompts (in the form, for example, of pull down menus and text input fields) whereby a user can define a set of desired conditions. For example, prompts for entering data defining an "if-then" condition may be provided. Other conditions may be defined in a similar manner. Further still, prompts may be provided to link various defined conditions together (e.g., logical operators such as "and", "or", "not", etc.) such that the desired states may be completely defined. For example, using this approach, a rule may be captured as "A project requires all developers to 'fix' priority 1' issues before code check in." Further examples will be readily defined by those having ordinary skill in the art. Further still, techniques for implementing such textual interfaces for capturing process patterns are known to those having ordinary skill in the art.

Referring once again to FIG. 5, and as noted above, first and second processing patterns are received at block 502 using, for example, any of the user interface mechanisms described above. Note that the first and second processing patterns do not necessarily need to be received within a short time of each other; in fact, because they are stored in a suitable storage device, virtually any period of time may pass between receipt of the first processing pattern and receipt of the second processing pattern. However, in an embodiment, it may be desirable to compare newly created processing patterns against existing processing patterns at the time the new processing patterns are created, e.g., when the user selects the save button 616. Regardless, processing continues at block 504 where it is determined whether there is an opportunity to merge the first and second processing patterns. In an embodiment, this achieved by comparing the various states defining each processing pattern. Note that, where a rule is not currently represented in a state graph form as in the case of the processing patterns described above, it may be possible to convert the rule into such a state graph form using well known techniques. Furthermore, techniques for comparing graph representations are well known in the art. Well known graph analysis libraries such as JUNG (currently available at: http://jung.sourceforge.net/) can be used for graph comparison. Similarly graph querying and comparison can be done using XPATH query language using tools such GQL4JUNG (currently available at: http://code.google.com/p/gql4jung/). Irrespective of the method used, the graph comparison establishes the degree of commonality between vertices and edges between two graphs. Thus, the higher the degree of commonality, the higher the confidence that those sections of the two graphs are similar. An example of this is illustrated in FIGS. 7-9.

Figure 7:
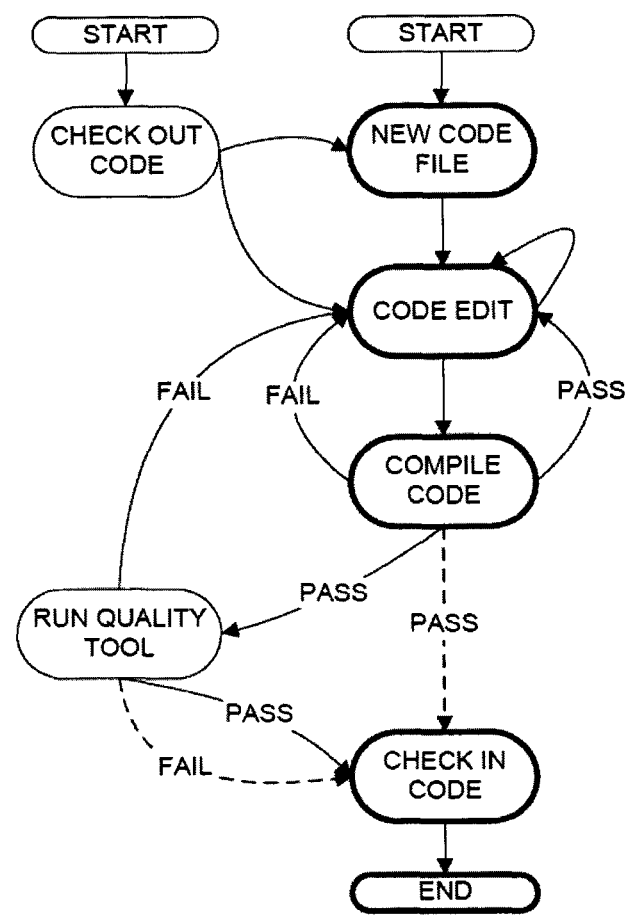
FIGS. 7-9 are illustrations an example of processing patterns in graph form and merging thereof in accordance with the instant disclosure.

FIG. 7 illustrates a first processing pattern that may be referred to as "Quality Check Adherence." As shown, the Quality Check Adherence processing pattern is represented as a state graph in which an initial state is either "New Code File" or "Check Out Code", the former pertaining to the instance where a new code file is created, whereas the latter pertains to an instance in which a code file already exists in a code repository. Regardless, other states illustrated in FIG. 7 include "Code Edit" (wherein a developer makes edits to a code file), "Compile Code" (corresponding to the act of compiling code in a code file), "Run Quality Tool" (corresponding to a code quality tool being executed on the code file in question) and "Check In Code" (in which the code file is checked into the code repository). As further shown, a number of state transitions between each state may be defined. Each state may comprise a variety of information used to define a given instance of that state, such as any input states (state(s) leading to this state) and/or output states (state(s) following this state); entity information that identifies which portion of code is relevant to this instance of that state; time of entry; time of exit; state result in those cases where an identifiable result is provided upon completion of the state; and a visit count indicating the number of times this state has been traversed for a given set of raw event data. Likewise, each transition may comprise various information such as input state (state from which the transition originates) and output states (state in which the transition terminates); last state result in those instances that a state result is available; initiation time indicating when a transition occurs; and a visit count indicating how many times the transition has occurred for a given set of raw data.

As shown, a number of the transitions include an indication of a state result corresponding to occurrence of that transition. For example, in the case of the "Compile Code" state, a "Fail" state result corresponds to a transition back to the "Code Edit" state, whereas a "Pass" state result corresponds to transitions either back to the "Code Edit" state or to the "Run Quality Tool" state. Furthermore, various hazardous transitions illustrated as dashed lines are shown as examples of transitions that sometimes, but should not, occur according to event data. For example, according to the defined process, a "Fail" result in the "Run Quality Tool" state should result in a transition to the "Code Edit" state. However, a hazardous transition that occurs with some frequency is a transition from the "Run Quality Tool" state to the "Check In Code" state despite the occurrence of the "Fail" result.

Figure 8:
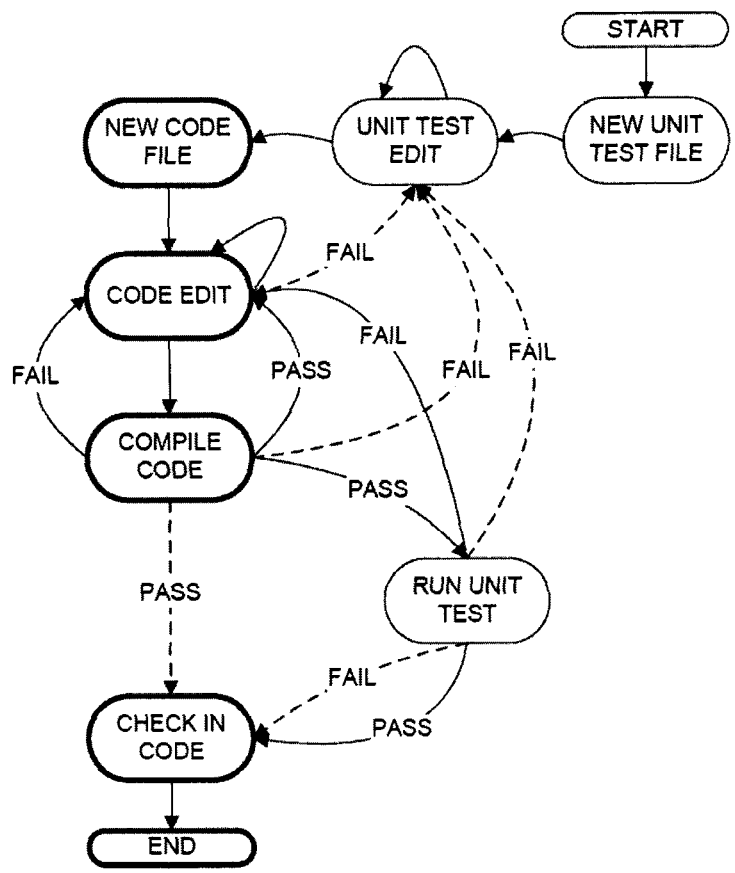
Figure 9:
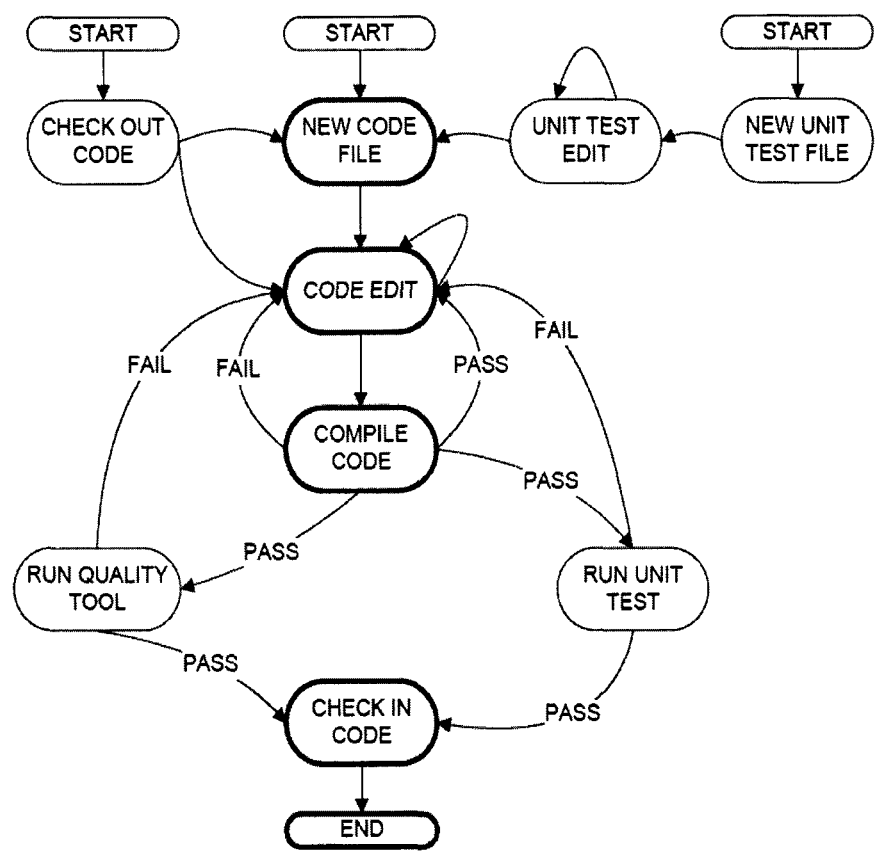

In a similar vein, FIG. 8 illustrates a processing pattern that may be referred to as "TDD Adherence." TDD (or Test Driven Design) is an approach to software development based on relatively quick iterations of testing and code editing. Regardless, in the example shown, the TDD Adherence processing pattern includes a number of virtually identical states, as highlighted in FIGS. 7 and 8 by the ovals having heavy outlines, i.e., the "New Code File", "Code Edit", "Compile Code", "Check In Code" and "End" states. However, unlike the Quality Check Adherence processing pattern, the sole starting state is a different state called "New Unit Test File" (corresponding to the creation of a unit test file by a developer) followed by a "Unit Test Edit" states (wherein a developer makes various changes to the unit test file). Furthermore, the "Run Quality Tool" state illustrated in FIG. 7 is replaced, essentially, by a "Run Unit Test" state as shown in FIG. 8. As before, the new states illustrated in FIG. 8 include various transitions between the states, including examples of several commonly-occurring hazardous transitions.

Using graph comparison techniques known to those having ordinary skill in the art, the similar states between the two graphs, i.e., the "New Code File", "Code Edit", "Compile Code", "Check In Code" and "End" states, are identified. Generally, graphs can be merged when the graphs have a common start and end point and the intermediate states can be reached through normal state transitions as defined in the individual graphs. Further, if there are any dead states or unreachable states, then graphs cannot be merged. Thus, in the instant example, based on this commonality of states, it is possible to combine the two processing patterns as further illustrated in FIG. 9. As shown, the merged processing pattern includes both the common states as well as the additional states unique to each of the first and second processing patterns. For ease of illustration, note that the merged processing pattern illustrated in FIG. 9 does not include any of the examples of hazardous transitions shown in FIGS. 7 and 8. Of course, it is nevertheless understood that transitions other than those illustrated in FIG. 9 may constitute hazardous transitions to the extent that they do not conform to the merged processing pattern.

Referring again to FIG. 5, if a merge opportunity between processing patterns is not found, then processing continues at block 510 where the respective processing patterns are converted to executable process verification rules, if not already done previously. For example, in the context of GEMS, as noted above, a plug-in program is available to convert the processing patterns into executable code. If not already stored, the resulting executable process verification rules are then stored as indicated at block 512. If, however, a merge opportunity is found at block 504, processing continues at block 506 where the first and second processing patterns are merged as shown, for example, in FIG. 9. Thereafter, processing may optionally continue at block 508 where the merged processing pattern is provided to a user in order to obtain feedback, if any, on the merged processing pattern. In an embodiment, the user may be a subject matter expert having particular knowledge about the desired software development processes for a given software development project. As will be appreciated by those having ordinary skill in the art, the fact that processing patterns may be merged may not be desirable in all situations, or may be desirable only after the merged processing pattern is modified is some fashion. For example, the merged processing pattern illustrated in FIG. 9 could presented to the user via a graphical user interface of the type illustrated in FIG. 6, thereby allowing the user to approve it without further edits, to edit it and then indicate approval or to reject the merged processing pattern. Assuming that the user approves of the merged processing pattern (with or without further edits), processing then continues at blocks 510, 512, as described above, only on the basis of the merged processing pattern.

Figure 10:
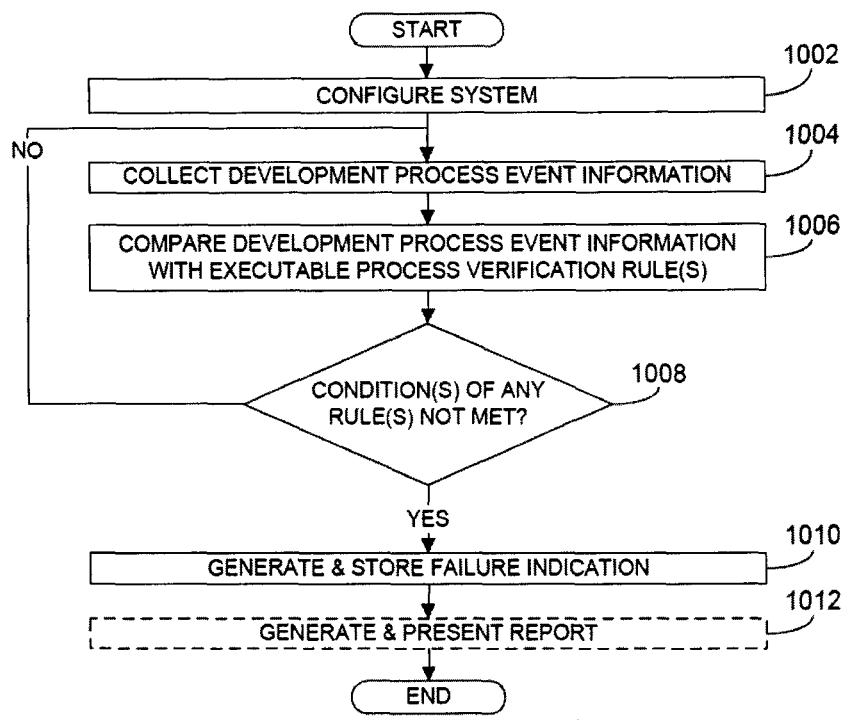
FIG. 10 is a flowchart illustrating a method for monitoring adherence by developers to a software code development process in accordance with various embodiments described herein.

Referring now to FIG. 10, a flowchart illustrating a method for monitoring adherence by developers to a software code development process is shown. In an embodiment, the processing described with regard to FIG. 10 is carried out, at least in part, by the system 100 illustrated in FIG. 1. Furthermore, the processing illustrated in FIG. 10 may be carried out with the aid of one or more processing devices, such as that described above relative to FIG. 4. Regardless, processing begins at block 1002 where the system 100 is configured. In an embodiment, such configuration comprises performing set up of one or more sensors to work with the various development tools 120 and configuring one or more rules, as described above, for the system. An example of the former is illustrated in FIG. 11, where a graphical user interface 1102 is provided.

The interface 1102 may be implemented, for example, by the rule configuration component 106. As shown, the interface 1102 comprises a configure sensors button 1104, a rule manager button 1106 and a reports button 1108. Selection of the configure sensors button 1104 causes the user interface 1102 to be displayed such that a user may configure previously deployed sensors. For example, as shown, each sensor may comprise a row in the illustrated table (differentiated, for example, by their respective descriptions) whereby a user is able to manipulate a check box to enable (select) or disable (de-select) a given sensor. Furthermore, a column is provided whereby an interval for each sensor may be designated, such interval to be used to determine how often the given sensor should provide its raw event data (or be checked to obtain such raw event data). As further shown, where a given sensor is implemented via, for example, a web service or other remote service, a pathname to the given service may be provided. Alternatively, where a sensor is simply embedded in a given tool, application, etc, the sensor may simply push the raw event data according to the selected frequency. A summary view window 1110 is provided whereby the number of sensors and/or rules currently enabled and configured may be displayed. Once the desired sensors have been selected and configured, a user may select a save sensor configuration button 1112 to save the input sensor configuration data. As known to those having ordinary skill in the art, the saved sensor configuration data is then used to ensure that the proper sensors are operating as desired.

Figure 12:
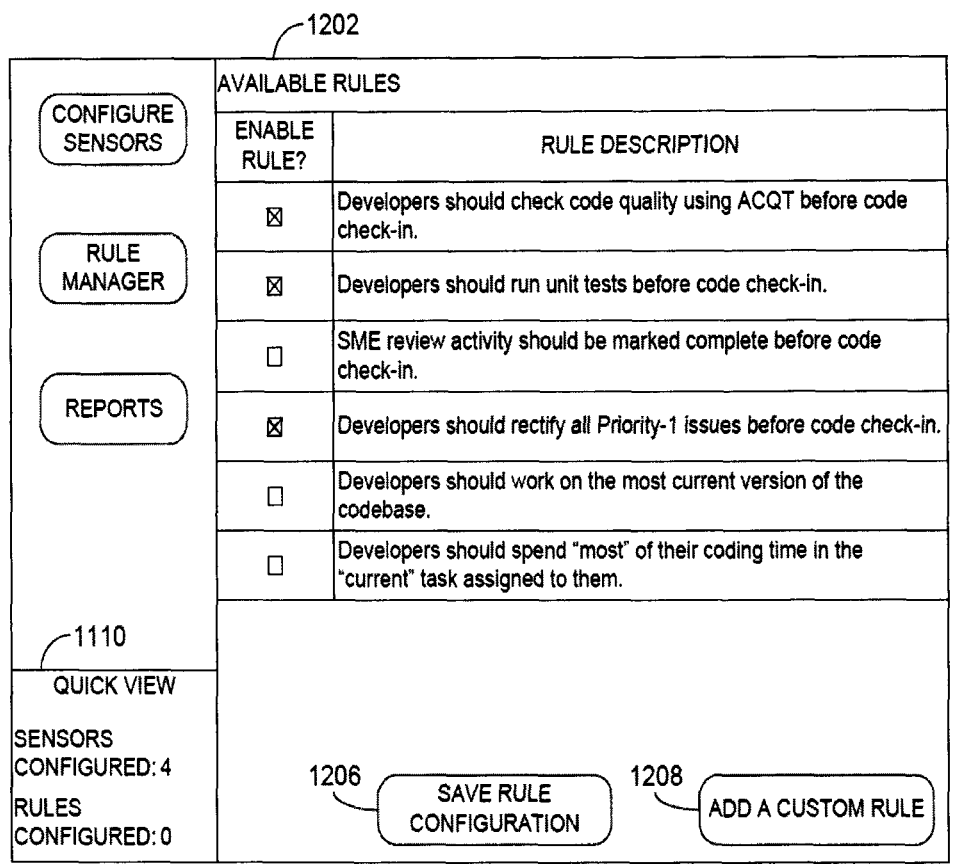

A further example of the latter type of configuration noted above relative to block 1002 is further illustrated with respect to FIG. 12. In particular, selection of the rule manager button 1106 may cause a graphical user interface 1202 to be provided. Note that, assuming the sensors configuration data of FIG. 11 is used, the summary view window 1110 reflects the fact that four different sensors have been configured at this point. In a manner similar to that employed by the sensor configuration interface 1102, the rule manager interface 1202 may provide separate rows for each available rule. Once again, in the illustrated example, the various rules are differentiated by their respective textual descriptions. Of course, some other identifying indicia, such as their respective titles, may be equally employed for this purpose. Regardless, a check box may be provided whereby a user can enable or disable a given rule. If all desired rules have been enabled, then the user may select a save rule configuration button 1206 thereby causing the entered rule configuration data to be saved. Alternatively, or additionally, an add a custom rule button 1208 may be selected whereby a user is able to define a new rule using, for example, the graphical user interface 600 described above. Having defined a new rule in this manner, the user may then enable the rule as noted above.

Referring once again to FIG. 10, after the system has been configured as desired, processing may continue at block 1004 where development process event information, as described above, is collected in accordance with the configuration information. Continuing at block 1006, the development process event information collected in this manner may be compared with the various executable process verification rules previously enabled at block 1002. It is then determined, at block 1008, whether any of the executable process verification rules have not been satisfied at block 1008, i.e., whether any of the rules have been violated. If not, processing continues at block 1004 where the process of gathering development process event data and comparing it against the enabled rules is repeated. Note that the determination whether a rule has been violated may be dictated by the sense in which the rule is defined. For example, a positive rule may indicate behaviors that are to be encouraged, i.e., the rule is only violated if the development process event data indicates that the process was deviated from in some manner. Alternatively, a negative rule may indicate behaviors that are to be avoided, i.e., the rule is only violated if the development process event data indicates that the undesired process was, in fact, carried out. As will be recognized by those having ordinary skill in the art, the various senses (positive or negative) used to define a rule may have attendant advantages and disadvantages. For example, a positive rule may be more useful where any of a number events could cause an unwanted deviation. Conversely, a negative rule may be useful in those instances in which an unwanted process is frequently employed by developers.

Figure 13:
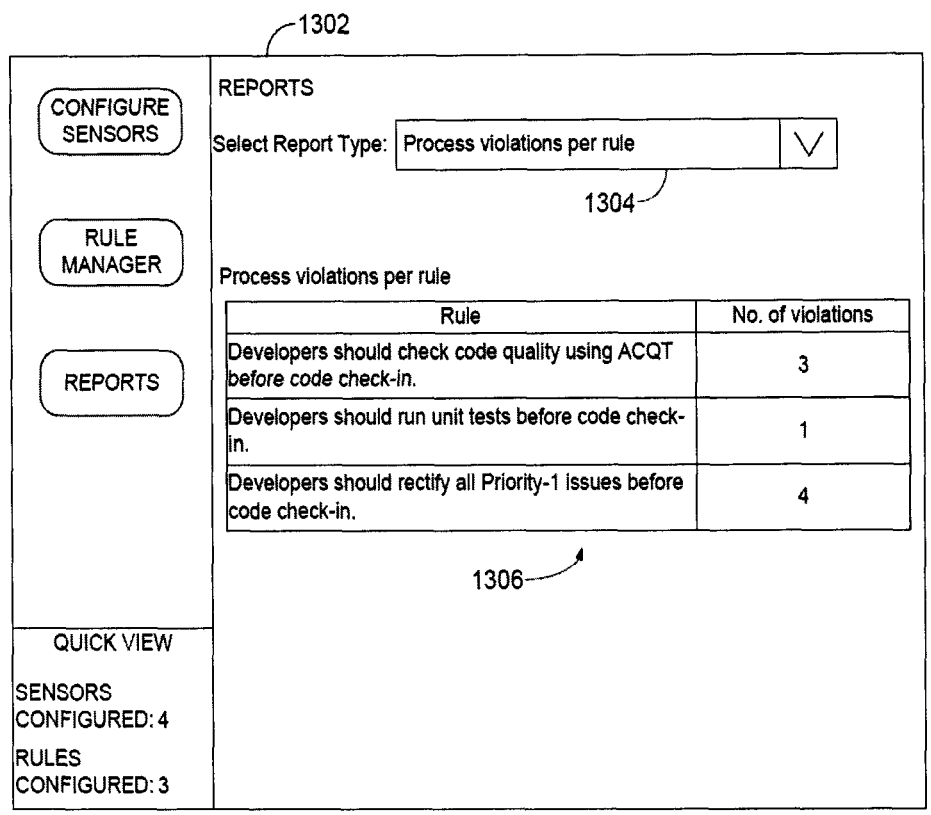

Regardless, if it is determined that at least one rule has been violated, processing continues at block 1010 where a failure indication is generated, as described above, and stored in a suitable storage component. Finally, at block 1012, a report may be optionally generated and presented to a requesting user. An example of a graphical user interface 1302 that may be used for this purpose is further illustrated with respect to FIG. 13. In an embodiment, the graphical user interface 1302 may be provided by the reporting component 112. In particular, the interface 1302 may be employed when a user selects the reports button 1108. As shown, the interface may comprise a mechanism for selecting the type of report to be generated; in the illustrated example, a pull down menu is employed for this purpose. Those having ordinary skill in the art will appreciate that mechanisms other than pull down menus may be utilized for this purpose. Regardless of the mechanism used to select the report, a report 1306 may be generated based on the data obtained using the process adherence systems described herein. In the illustrated example, the number of process violations per rule is provided. Using well known techniques, the report 1306 may be provided to any desired channel (e.g., a printer for hard copy output, a suitable application for generating and storing an electronic file, electronic mail, RSS feeds, etc.).

As described above, the instant disclosure describes various methods and apparatus for improving the management of various rules for use in a process adherence monitoring system. This is generally achieved by merging processing patterns, where possible, and using the resulting merged processing pattern to generate an executable process verification rule. Such rules may then be employed in the process adherence monitoring system to determine the level of adherence to one or more processes represented by the executable process verification rule. By merging rules in this manner, the number of rules may be decreased, thereby eliminating redundant processing when comparing the rules to development process event data. Furthermore, the number of rules may be reduced in this manner, thereby simplifying management of the system. For at least these reasons, the above-described techniques represent an advancement over prior art teachings.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

We claim:

1. A method comprising:
   receiving, by a processing device, a first process pattern descriptive of a first portion of a software code development process,
      the first process pattern including a first plurality of states;
   receiving, by the processing device, a second process pattern descriptive of another portion of the software code development process,
      the second process pattern including a second plurality of states;
   determining, by the processing device, a first number of the first plurality of states that match a corresponding number of the second plurality of states;
   determining, by the processing device, a second number of the first plurality of states that do not match any of the second plurality of states;

determining, by the processing device, a third number of the second plurality of states that do not match any of the first plurality of states;

merging, by the processing device, the first process pattern and the second process pattern to provide a merged processing pattern, the merging including:

merging the first number of the first plurality of states that match the corresponding number of the second plurality of states to created a merged plurality of states, and adding, to the merged plurality of states, one or more states that correspond to the second number of the first plurality of states and one or more states that correspond to the third number of the second plurality of states;

converting, by the processing device, the merged processing pattern into a verification rule; and using, by the processing device, the verification rule to process event information associated with a system.

2. The method of claim 1, where, when merging the first process pattern and the second process pattern, the method further comprises:

converting the first process pattern into a first graph;
converting the second process pattern into a second graph;
determining one or more points of intersection between the first graph and the second graph;
generating a merged graph based on the one or more points of intersection between the first graph and the second graph; and
converting the merged graph into the merged processing pattern.

3. The method of claim 1, where, when receiving the first process pattern, the method further comprises:

receiving the first process pattern via at least one of a graphical user interface or a textual user interface, and
where, when receiving the second process pattern, the method further comprises:
receiving the second process pattern via at least one of the graphical user interface or the textual user interface.

4. The method of claim 1, further comprising:
collecting development process event information;
comparing the development process event information with the verification rule; and
generating a failure indication when at least one condition of the verification rule is not satisfied by the development process event information.

5. The method of claim 4, where, when collecting the development process event information, the method further comprises:
collecting development process event data from at least one development tool; and
filtering the development process event data according to filtering rules to provide the development process event information.

6. The method of claim 4, further comprising:
storing the failure indication;
generating a report based on the stored failure indication; and
providing the report.

7. An apparatus comprising:
a memory to store instructions; and
a processor to execute the instructions to:
receive a first process pattern descriptive of a first portion of a software code development process, the first process pattern including a first plurality of states;
receive a second process pattern descriptive of another portion of the software code development process, the second process pattern including a second plurality of states;
determine a first number of the first plurality of states that match a corresponding number of the second plurality of states;
determine a second number of the first plurality of states that do not match any of the second plurality of states;
determine a third number of the second plurality of states that do not match any of the first plurality of states;
merge the first process pattern and the second process pattern to provide a merged processing pattern, the processor, when merging the first process pattern and the second process pattern, being to:
merge the first number of the first plurality of states that match the corresponding number of the second plurality of states to created a merged plurality of states, and
add, to the merged plurality of states, one or more states that correspond to the second number of the first plurality of states and one or more states that correspond to the third number of the second plurality of states;
convert the merged processing pattern into a verification rule; and
use the verification rule to process event information associated with a system.

8. The apparatus of claim 7, where the processor, when merging the first process pattern and the second process pattern, is further to:
convert the first process pattern into a first graph;
convert the second process pattern into a second graph;
determine one or more points of intersection between the first graph and the second graph;
generate a merged graph based on the one or more points of intersection between the first graph and the second graph; and
convert the merged graph into the merged processing pattern.

9. The apparatus of claim 7, where the processor, when receiving the first process pattern, is further to:
receive the first process pattern via at least one of a graphical user interface or a textual user interface, and
the processor, when receiving the second process pattern, is further to:
receive the second process pattern via at least one of the graphical user interface or the textual user interface.

10. The apparatus of claim 7, where the processor is further to:
collect development process event information;
compare the development process event information with the verification rule; and
generate a failure indication when at least one condition of the verification rule is not satisfied by the development process event information.

11. The apparatus of claim 10, where the processor, when collecting the development process event information, is further to:
collect development process event data from at least one development tool; and
filter the development process event data according to filtering rules to provide the development process event information.

12. The apparatus of claim 10, where the processor is further to:

store the failure indication;
generate a report based on the stored failure indication; and
provide the report.

13. A non-transitory computer readable medium storing instructions, the instructions comprising:
one or more instructions which, when executed by at least one processor, cause the at least one processor to:
receive a first process pattern descriptive of a first portion of a software code development process,
the first process pattern including a first plurality of states;
receive a second process pattern descriptive of another portion of the software code development process,
the second process pattern including a second plurality of states;
determine a first number of the first plurality of states that match a corresponding number of the second plurality of states;
determine a second number of the first plurality of states that do not match any of the second plurality of states;
determine a third number of the second plurality of states that do not match any of the first plurality of states;
merge the first process pattern and the second process pattern to provide a merged process pattern, the one or more instructions to merge the first process pattern and the second process pattern including:
one or more instructions to merge the first number of the first plurality of states that match the corresponding number of the second plurality of states to created a merged plurality of states, and
one or more instructions to add, to the merged plurality of states, one or more states that correspond to the second number of the first plurality of states and one or more states that correspond to the third number of the second plurality of states;
convert the merged process pattern into a verification rule; and
use the verification rule to process event information associated with a system.

14. The non-transitory computer readable medium of claim 13, where the one or more instructions to receive the first process pattern include:
one or more instructions to receive the first process pattern using at least one of a graphical user interface or a textual user interface, and
the one or more instructions to receive the second process pattern include:
one or more instructions to receive the second process pattern via at least one of the graphical user interface or the textual user interface.

15. The non-transitory computer readable medium of claim 13, where the one or more instructions to merge the first process pattern and the second process pattern include:
one or more instructions to convert the first process pattern into a first graph;
one or more instructions to convert the second process pattern into a second graph;
one or more instructions to determine one or more points of intersection between the first graph and the second graph;
one or more instructions to generate a merged graph based on the one or more points of intersection between the first graph and the second graph; and
one or more instructions to convert the merged graph into the merged process pattern.

16. The non-transitory computer readable medium of claim 13, where the instructions further comprise:
one or more instructions to collect development process event information;
one or more instructions to compare the development process event information with the verification rule; and
one or more instructions to generate a failure indication when at least one condition of the verification rule is not satisfied by the development process event information.

17. The non-transitory computer readable medium of claim 16, where the one or more instructions to collect the development process event information include:
one or more instructions to collect development process event data; and
one or more instructions to filter the development process event data according to filtering rules to provide the development process event information.

18. The non-transitory computer readable medium of claim 16, where the instructions further comprise:
one or more instructions to store the failure indication;
one or more instructions to generate a report based on the stored failure indication; and
one or more instructions to provide the report.

19. The method of claim 1, further comprising:
collecting first development process event information;
determining that the first development process event information satisfies the verification rule;
collecting, based on determining that the first development process event information satisfies the verification rule, second development process event information;
comparing the second development process event information with the verification rule; and
generating a failure indication when at least one condition of the verification rule is not satisfied by the second development process event information.

20. The apparatus of claim 7, where the processor is further to:
collect first development process event information;
determine that the first development process event information satisfies the verification rule;
collect, based on determining that the first development process event information satisfies the verification rule, second development process event information;
compare the second development process event information with the verification rule; and
generate a failure indication when at least one condition of the verification rule is not Satisfied by the second development process event information.

* * * * *